US012812585B2

(12) United States Patent
Kucera

(10) Patent No.: US 12,812,585 B2
(45) Date of Patent: Nov. 24, 2026

(54) METHOD AND APPARATUS FOR SIDELINK POSITIONING

(71) Applicant: Nokia Technologies Oy, Espoo (FI)

(72) Inventor: Stepan Kucera, Munich (DE)

(73) Assignee: Nokia Technologies Oy, Espoo (FI)

( * ) Notice: Subject to any disclaimer, the term of this patent is extended or adjusted under 35 U.S.C. 154(b) by 289 days.

(21) Appl. No.: 18/412,892

(22) Filed: Jan. 15, 2024

(65) Prior Publication Data

US 2024/0276422 A1 Aug. 15, 2024

(30) Foreign Application Priority Data

Feb. 14, 2023 (GB) ..................................... 2302058

(51) Int. Cl.

*H04W 64/00* (2009.01)
*H04W 28/26* (2009.01)
*H04W 72/25* (2023.01)
*H04W 92/18* (2009.01)

(52) U.S. Cl.

CPC ........... *H04W 64/00* (2013.01); *H04W 28/26* (2013.01); *H04W 72/25* (2023.01); *H04W 92/18* (2013.01)

(58) Field of Classification Search

CPC ..... H04W 64/00; H04W 28/26; H04W 72/25; H04W 92/18; H04W 76/14; H04W 4/46; H04L 5/0048

See application file for complete search history.

(56) References Cited

U.S. PATENT DOCUMENTS

2009/0253453 A1* 10/2009 Zhang ................. H04W 52/225 455/522
2021/0297206 A1* 9/2021 Manolakos ....... H04W 72/0446
2022/0070851 A1* 3/2022 Zhang ................... H04L 1/0046

(Continued)

FOREIGN PATENT DOCUMENTS

EP 4060923 A1 9/2022
EP 4072195 A1 10/2022

(Continued)

OTHER PUBLICATIONS

Patrick Merias et al: "Moderator Summary #4 on potential solutions for SL positioning", 3GPP Draft; R1-2212938; Type Discussion; FS_NR_POS_ENH2, vol. 3GPP RAN 1, No. Toulouse, FR; Nov. 21, 2022. (Year: 2022).*

(Continued)

*Primary Examiner* — Yuwen Pan
*Assistant Examiner* — Swati Jain
(74) *Attorney, Agent, or Firm* — Lippes Mathias LLP

(57) ABSTRACT

An apparatus, method and computer program is described for positioning of a first terminal device with respect to one or more second terminal devices according to a positioning procedure. The apparatus comprises a means for transmitting, to the one or more second terminal devices, a first sidelink signal comprising control information relating to the positioning procedure. The apparatus further comprises a means for receiving, from at least one of the one or more second terminal devices, a second sidelink signal comprising at least part of said control information. The second sidelink signal further comprises information relating to transmission of a positioning signal by said respective second terminal device for the positioning procedure.

20 Claims, 9 Drawing Sheets

(56) References Cited

U.S. PATENT DOCUMENTS

| | | | | |
|---|---|---|---|---|
| 2022/0322363 | A1* | 10/2022 | Yang | H04L 1/16 |
| 2022/0365163 | A1* | 11/2022 | Baek | G01S 1/042 |
| 2022/0397633 | A1* | 12/2022 | Baek | G01S 5/0072 |
| 2022/0416976 | A1* | 12/2022 | Baek | H04L 5/0051 |
| 2023/0011471 | A1* | 1/2023 | Sarkis | H04W 64/00 |
| 2023/0011514 | A1* | 1/2023 | Wang | H04W 72/569 |
| 2023/0062805 | A1* | 3/2023 | Baek | H04L 5/0051 |
| 2024/0147504 | A1* | 5/2024 | Dai | H04W 76/40 |
| 2024/0188153 | A1* | 6/2024 | Hoang | G01S 5/0072 |
| 2024/0334455 | A1* | 10/2024 | Zhang | H04W 72/25 |
| 2025/0048395 | A1* | 2/2025 | Ren | H04L 5/0053 |
| 2025/0317250 | A1* | 10/2025 | Zhang | H04W 72/044 |
| 2025/0365696 | A1* | 11/2025 | Zhang | H04W 64/00 |

FOREIGN PATENT DOCUMENTS

| | | | | |
|---|---|---|---|---|
| WO | 2021/188208 | A1 | 9/2021 | |
| WO | 2022/212533 | A1 | 10/2022 | |
| WO | 2022/222054 | A1 | 10/2022 | |
| WO | WO-2023166396 | A1 * | 9/2023 | H04W 64/00 |

OTHER PUBLICATIONS

"New WID on Expanded and Improved NR Positioning", 3GPP TSG RAN Meeting #98-e, RP-223549, Agenda: 9.1.1, Intel Corporation, Dec. 12-16, 2022, pp. 1-7. (Year: 2022).*

"Msc-generator", Sourceforge, Retrieved on Dec. 12, 2023, Webpage available at : https://sourceforge.net/ projects/msc-generator/ (Year: 2023).*

"Discussion on potential solutions for SL positioning", 3GPP TSG RAN WG1 #111, R1-2212371, Agenda: 9.5.1.2, NEC, Nov. 14-18, 2022, 8 pages. (Year: 2022).*

Extended European Search Report received for corresponding European Patent Application No. 23212507.0, dated May 24, 2024, 12 pages.

"Moderator Summary #4 on potential solutions for SL positioning", 3GPP TSG RAN WG1 #111, R1-2212938, Agenda: 9.5.1.2, Qualcomm, Nov. 14-18, 2022, 82 pages.

"New WID on Expanded and Improved NR Positioning", 3GPP TSG RAN Meeting #98-e, RP-223549, Agenda: 9.1.1, Intel Corporation, Dec. 12-16, 2022, pp. 1-7.

"Msc-generator", Sourceforge, Retrieved on Dec. 12, 2023, Webpage available at : https://sourceforge.net/projects/msc-generator/.

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"Discussion on potential solutions for SL positioning", 3GPP TSG RAN WG1 #111, R1-2212371, Agenda: 9.5.1.2, NEC, Nov. 14-18, 2022, 8 pages.

"IEEE 802.11", Wikipedia, Retrieved on Dec. 1, 2023, Webpage available at : https://en.wikipedia.org/wiki/IEEE_802.11.

Combined Search and Examination Report received for corresponding United Kingdom Patent Application No. 2302058.9, dated Aug. 1, 2023, 3 pages.

"Moderator Summary #3 on potential solutions for SL positioning", 3GPP TSG RAN WG1 #111, R1-2212900, Agenda: 9.5.1.2, Qualcomm, Nov. 14-18, 2022, 79 pages.

* cited by examiner

METHOD AND APPARATUS FOR SIDELINK POSITIONING

RELATED APPLICATION

This application claims priority to, and the benefit of, GB Application No. 2302058.9, filed on Feb. 14, 2023, the contents of which is incorporated herein by reference in its entirety.

FIELD

Example embodiments describe apparatus, systems, methods and/or computer programs related to positioning.

BACKGROUND

Positioning or localization may be performed using wireless devices such as radio frequency based devices. Positioning may involve determining the current location of the device. The device may, for example, be a terminal device or a user equipment (UE) such as a mobile phone, a vehicle, craft or machine. Measuring the location of the device at a given time may be important for, for example, providing location-based services, for collision avoidance of mobile objects and/or to ensure certain operations and processes are going to plan.

There remains an ongoing need for improved positioning of devices.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is described an apparatus for positioning of a first terminal device with respect to one or more second terminal devices according to a positioning procedure, the apparatus comprising: means for transmitting, to said one or more second terminal devices, a first sidelink signal comprising control information relating to said positioning procedure; and means for receiving, from at least one of said one or more second terminal devices, a second sidelink signal comprising at least part of said control information, wherein said second sidelink signal further comprises information relating to transmission of a positioning signal by said respective second terminal device for said positioning procedure.

In some embodiments, said control information comprises a resource block reservation for said positioning signals.

In some embodiments, said control information further comprises a priority of said positioning procedure.

In some embodiments, said priority of said positioning procedure is a function of a number of said second terminal devices.

In some embodiments, said first sidelink signal further comprises information relating to transmission of a second positioning signal by said first terminal device for said positioning procedure.

In some embodiments, said positioning procedure information further comprises time slots reservations for transmission of each of said positioning signals.

In some embodiments, said first and/or second sidelink signal further comprises information relating to identification of said respective second terminal device and/or identification of said first terminal device.

In some embodiments, the apparatus further comprises means for receiving, from one or more of said second terminal devices, said respective positioning signal(s).

In some embodiments, the apparatus further comprises means for transmitting, to one or more of said second terminal devices, said second positioning signal.

According to a second aspect, there is described an apparatus for positioning of a first terminal device with respect to one or more second terminal devices according to a positioning procedure, the apparatus comprising: means for receiving a first sidelink signal comprising control information relating to said positioning procedure; and means for transmitting a second sidelink signal comprising at least part of said control information, wherein said second sidelink signal further comprises information relating to transmission of a positioning signal by said respective second terminal device for said positioning procedure.

In some embodiments, said control information comprises a resource block reservation for said positioning signals.

In some embodiments, said control information further comprises a priority of said positioning procedure.

In some embodiments, said priority of said positioning procedure is a function of a number of said second terminal devices.

In some embodiments, said first sidelink signal further comprises information relating to transmission of a second positioning signal by said first terminal device for said positioning procedure.

In some embodiments, said positioning procedure information further comprises time slots reservations for transmission of each of said positioning signals.

In some embodiments, said first and/or second sidelink signal further comprises information relating to identification of said respective second terminal device and/or identification of said first terminal device.

In some embodiments, the apparatus further comprises means for transmitting said respective positioning signal(s).

In some embodiments, the apparatus further comprises means for receiving said second positioning signal.

According to a third aspect, there is described a system comprising the apparatus according to the first aspect and an apparatus according to the second aspect.

According to a fourth aspect, there is described a user device comprising an apparatus according to the first or second aspect.

According to a fifth aspect, there is described a network node comprising an apparatus according to the first or second aspect.

According to a sixth aspect, there is described a method for positioning of a first terminal device with respect to one or more second terminal devices according to a positioning procedure, the method comprising: transmitting, to said one or more second terminal devices, a first sidelink signal comprising control information relating to said positioning procedure; and receiving, from at least one of said one or more second terminal devices, a second sidelink signal comprising at least part of said control information, wherein said second sidelink signal further comprises information relating to transmission of a positioning signal by said respective second terminal device for said positioning procedure.

In some embodiments, said control information comprises a resource block reservation for said positioning signals.

In some embodiments, said control information further comprises a priority of said positioning procedure.

In some embodiments, said priority of said positioning procedure is a function of a number of said second terminal devices.

In some embodiments, said first sidelink signal further comprises information relating to transmission of a second positioning signal by said first terminal device for said positioning procedure.

In some embodiments, said positioning procedure information further comprises time slots reservations for transmission of each of said positioning signals.

In some embodiments, said first and/or second sidelink signal further comprises information relating to identification of said respective second terminal device and/or identification of said first terminal device.

In some embodiments, the method further comprises receiving, from one or more of said second terminal devices, said respective positioning signal(s).

In some embodiments, the method further comprises transmitting, to one or more of said second terminal devices, said second positioning signal.

According to a seventh aspect, there is described a method for positioning of a first terminal device with respect to one or more second terminal devices according to a positioning procedure, the method comprising: receiving a first sidelink signal comprising control information relating to said positioning procedure; and transmitting a second sidelink signal comprising at least part of said control information, wherein said second sidelink signal further comprises information relating to transmission of a positioning signal by said respective second terminal device for said positioning procedure.

In some embodiments, said control information comprises a resource block reservation for said positioning signals.

In some embodiments, said control information further comprises a priority of said positioning procedure.

In some embodiments, said priority of said positioning procedure is a function of a number of said second terminal devices.

In some embodiments, said first sidelink signal further comprises information relating to transmission of a second positioning signal by said first terminal device for said positioning procedure.

In some embodiments, said positioning procedure information further comprises time slots reservations for transmission of each of said positioning signals.

In some embodiments, said first and/or second sidelink signal further comprises information relating to identification of said respective second terminal device and/or identification of said first terminal device.

In some embodiments, the method further comprises transmitting said respective positioning signal(s).

In some embodiments, the method further comprises receiving said second positioning signal.

According to a eighth aspect, there is provided a computer program product comprising a set of instructions which, when executed on an apparatus, is configured to cause the apparatus to carry out a method for positioning of a first terminal device with respect to one or more second terminal devices according to a positioning procedure, the method comprising: transmitting, to said one or more second terminal devices, a first sidelink signal comprising control information relating to said positioning procedure; and receiving, from at least one of said one or more second terminal devices, a second sidelink signal comprising at least part of said control information, wherein said second sidelink signal further comprises information relating to transmission of a positioning signal by said respective second terminal device for said positioning procedure.

Optional features of the eighth aspect may comprise any features of the sixth aspect.

According to a ninth aspect, there is provided a computer program product comprising a set of instructions which, when executed on an apparatus, is configured to cause the apparatus to carry out a method for positioning of a first terminal device with respect to one or more second terminal devices according to a positioning procedure, the method comprising: receiving a first sidelink signal comprising control information relating to said positioning procedure; and transmitting a second sidelink signal comprising at least part of said control information, wherein said second sidelink signal further comprises information relating to transmission of a positioning signal by said respective second terminal device for said positioning procedure.

Optional features of the ninth aspect may comprise any features of the seventh aspect.

According to a tenth aspect, there is provided a non-transitory computer readable medium comprising program instructions stored thereon for performing a method for positioning of a first terminal device with respect to one or more second terminal devices according to a positioning procedure, the method comprising: transmitting, to said one or more second terminal devices, a first sidelink signal comprising control information relating to said positioning procedure; and receiving, from at least one of said one or more second terminal devices, a second sidelink signal comprising at least part of said control information, wherein said second sidelink signal further comprises information relating to transmission of a positioning signal by said respective second terminal device for said positioning procedure.

The program instructions of the tenth aspect may also perform operations according to any preceding method definition of the sixth aspect.

According to a eleventh aspect, there is provided a non-transitory computer readable medium comprising program instructions stored thereon for performing a method for positioning of a first terminal device with respect to one or more second terminal devices according to a positioning procedure, the method comprising: receiving a first sidelink signal comprising control information relating to said positioning procedure; and transmitting a second sidelink signal comprising at least part of said control information, wherein said second sidelink signal further comprises information relating to transmission of a positioning signal by said respective second terminal device for said positioning procedure.

The program instructions of the eleventh aspect may also perform operations according to any preceding method definition of the seventh aspect.

According to a twelfth aspect, there is provided an apparatus comprising: at least one processor; and at least one memory including computer program code which, when executed by the at least one processor, causes the apparatus to: transmit, to said one or more second terminal devices, a first sidelink signal comprising control information relating to said positioning procedure; and receive, from at least one of said one or more second terminal devices, a second sidelink signal comprising at least part of said control information, wherein said second sidelink signal further comprises information relating to transmission of a positioning signal by said respective second terminal device for said positioning procedure.

The computer program code of the twelfth aspect may also perform operations according to any preceding method definition of the sixth aspect.

According to a thirteenth aspect, there is provided an apparatus comprising: at least one processor; and at least one memory including computer program code which, when executed by the at least one processor, causes the apparatus to: receive a first sidelink signal comprising control information relating to said positioning procedure; and transmit a second sidelink signal comprising at least part of said control information, wherein said second sidelink signal further comprises information relating to transmission of a positioning signal by said respective second terminal device for said positioning procedure.

The computer program code of the thirteenth aspect may also perform operations according to any preceding method definition of the seventh aspect.

BRIEF DESCRIPTION OF THE DRAWINGS

Example embodiments will now be described by way of non-limiting example, with reference to the accompanying drawings, in which.

DETAILED DESCRIPTION

Figure 1:
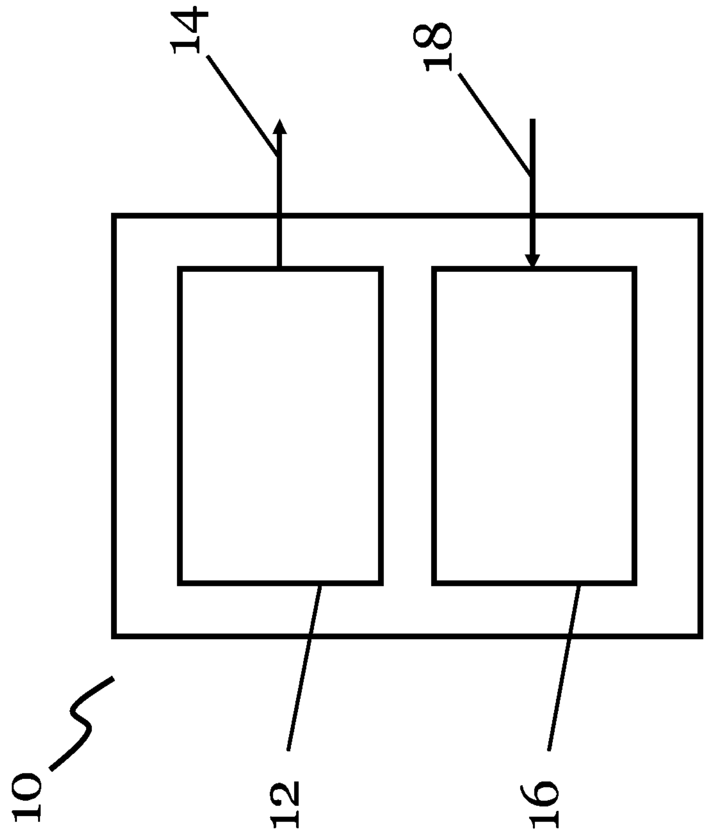
FIG. 1 illustrates an apparatus according to an example embodiment.

Example embodiments describe an apparatus, method and computer program relating to positioning, for example positioning of a first (target) terminal device with respect to one or more second (anchor) terminal devices according to a positioning procedure.

Positioning may be used to track the location of the terminal device. This may be important for safety for example collision avoidance of a vehicle comprising the first (target) terminal device.

Positioning may involve transmission/reception of signals between multiple nodes in a network and functions. For example, positioning may involve transmission of uplinks/downlinks between a UE and a base station (gNB). Positioning may also involve transmission/reception of sidelink signals between multiple UEs. Positioning may involve a Location Management Function (LMF) to calculate the position of the device based on data from several sources.

To avoid congestion of the spectrum, resources may be coordinated by one or more nodes in the network. For example, resources may be coordinated by the gNB. The central role of the gNBs may be used to implement the coordination and allocation of tasks efficiently, this may include support from the LMF depending on the scenario.

In partial or out of coverage situations (for example, in Mode 2 of 3GPP), multiple UEs may coordinate resources. In some devices, UEs coordinate resources by sensing transmission or information from other UEs.

Positioning or localization may involve determining the absolute position (location) of a first (target) terminal device or relative position of the first terminal device with respect to one or more other second (anchor) terminal devices. Positioning may involve transmission and reception of a positioning signal between one or more base stations (gNB) and one or more terminal devices. Positioning may involve use of a Location Management Function (LMF). An LMF module may be part of the network. A LMF may receive location data from one or more gNBs involved in the positioning procedure and calculate an estimated location of the target device.

Positioning may involve transmission or reception of a positioning signal from the first (target) terminal device or one or more of the second (anchor) terminal devices. Positioning signal may include a Positioning Reference Signal (PRS) as defined under the 3GPP standard or any other signal suitable for a positioning technique. This may involve positioning techniques such as Observed Time Difference Of Arrival (OTDOA), Angle of Arrival (AoA), Angle of Departure (AoD), Time of Arrival (ToA), Round Trip Time (RTT), multi-RTT, triangulation or any other technique known in the art. However, example embodiments are not limited to such positioning techniques.

A first terminal device may be the target device i.e. the device that is to be positioned by the procedure.

A second terminal device may be an anchor device. An anchor device may include a device that participates in sidelink positioning to assist a target device positioning. The absolute position of the anchor device may be known for the absolute sidelink positioning, but may not be known for the relative sidelink positioning The use of systems such as Global Navigation Satellite System (GNSS) is well known but may not provide positioning of a device to sufficient precision or accuracy.

Terminal devices may be a UE such as a mobile phone, smart phone, tablet computer or other device capable of transmitting and/or receiving wireless signals such as radio signals. Terminal device may be capable of wireless communication.

Terminal devices may employ known technologies such as telecommunication technologies such as 3G, 4G, 5G etc, Bluetooth, Wi-Fi (IEEE 802.11), Ultra Wideband (UWB) to give some examples for positioning. Example embodiments are not limited to such technologies because the general methodologies described herein may be applicable to any such examples and also to other communication technologies, including future communication technologies.

For example, in telecommunication technologies may utilize uplink, downlink and/or sidelink signals. In general, uplink is the direct communications from a device to the network node or base station (gNB). In contrast, downlink is the direct communications from the base station (gNB) to a device. Sidelink is the direct communications from one device to another device. Sidelink signals may provide lower latency than uplink/downlinks. Sidelinks may also enable communications with one or more devices that are out of range of a base station (gNB).

In some example embodiments, first and second devices may both be in range of a gNB and each other for direct communications. This is sometimes referred to as an in coverage scenario. In in coverage scenarios, the devices may utilize uplinks, downlinks and sidelinks. In some embodiments, the gNB may coordinate resources of each of the devices. For example, the gNB may assign resources to a transmitting UE, or may assign a pool of resources the UE selects from. This may be part of Mode 1 as defined by the 3GPP standard.

In other example embodiments, a first device may be in range of a gNB and a second device for direct communications. The second device may not be in range of a gNB. This is sometimes referred to as a partial coverage scenario. In a partial coverage scenario, the first device may utilize uplinks and downlinks with the gNB and sidelinks with the second device. The second device may only utilize sidelinks with the first device. In some embodiments, the first device acts as a pseudo base station for the second device. For example the first device may relay signals between the gNB and the second devices using uplinks, downlinks and sidelinks. In some examples, the gNB may control resources of the first device. In some embodiments, the second device uses pre-configured values. In some examples, the gNB may coordinate resources of the first and second devices.

In other example embodiments, a first device and a second device are not in range of a gNB thus neither can utilize uplink or downlinks. The first and second device may be in range of each other and may utilize sidelinks. In some embodiments either the first or second device may coordinate resources for both devices using sidelinks. In some embodiments, coordination of sidelinks may utilize sidelink control information signals. This may be part of Mode 2 as defined by the 3GPP standard.

5G New Radio (NR) provides the PC5 interface for one-to-many sidelink communications. In PC5, resources assigned to the sidelink are taken from the uplink i.e. from the subframes on the uplink frequency or from the subframes assigned to uplink in time. Sidelinks comprise the Physical Sidelink Control Channel (PSCCH) which contains the Sidelink Control Information (SCI). The SCI carries the information the receiving UE requires in order to be able to receive and demodulate the PSSCH. The SCI is typically sent in advance to a data block.

Sidelink transmission and reception requires resource pools. A resource pool is a set of resources assigned to the sidelink operation. It consists of the subframes and the resource blocks. Reception Resource Pools (Rx RPs) and Transmission Resource Pools (Tx RPs) are either signaled by the gNB for the in coverage case or preconfigured for the out-of-coverage case. There are two modes of resource assignment: in Mode 1, the gNB indicates the resources to be used for transmission, including the resources within an resource pool; in Mode 2, the UE selects a resource pool and the resources therein from a set of assigned pools.

With the SCI, the receiving UE can identify on the physical layer, whether the data packet is intended for it and deduce the information necessary to demodulate. The SCI in 5G NR V2X is transmitted in two stages. The stage 1 SCI in NR is carried on the PSCCH while stage 2 SCI is carried on the corresponding PSSCH. Splitting the SCI in two stages allows other UEs which are not RX UEs of a transmission to decode only stage 1 SCI for channel sensing purposes, i.e., for determining the resources reserved by other transmissions. On the other hand, the stage 2 SCI provides additional control information which is required for the RX UE(s) of a transmission.

Stage 1 SCI may contain information such as:
Priority;
Frequency/time resource assignment;
Modulation and coding scheme;
Resource reservation period;
Demodulation Reference Signal (DMRS) pattern;
Stage 2 SCI format;
Reserved;
Beta offset indicator;
Number of DMRS port.

Stage 2 SCI may contain information such as:
Source ID;
Destination ID;
Hybrid Automatic Repeat Request (HARQ) process ID;
New data indicator;
Redundancy version;
Channel Status Information (CSI) request.

5G NR defines multiple positioning techniques that require coordinated resource allocation for both positioning anchors and the target UE, for example OTDOA or multi-RTT.

In legacy positioning, the gNBs may implement the coordination and allocation of tasks efficiently, possibly with the support of the Location Management Function (LMF) depending on the scenario. However, this is not possible when Mode 2 resource allocation is used, that is, when SL UEs conduct resource allocation by themselves without the involvement of the gNB. Mode 2 allocation is typical for sidelink out of gNB coverage but it can be configured by the gNB even in partial coverage/in-coverage scenarios (i.e. instead or in parallel to Mode 1).

FIG. 1. illustrates an apparatus, referenced generally by 10; according to an example embodiment. The apparatus 10 may be used for positioning of a first terminal device (not shown) with respect to one or more second terminal devices (not shown) according to a positioning procedure.

The apparatus 10 comprises a means for transmitting 12 a first sidelink signal 14. The first sidelink signal 14 may comprise sidelink control information relating to a positioning procedure. The first sidelink signal 14 may be transmitted to one or more second terminal devices.

The apparatus 10 further comprises a means for receiving 16 a second sidelink signal 18. The second sidelink signal 18 may comprise at least part of the sidelink control information provided by the first sidelink signal 14. The second sidelink signal 18 may further comprise information relating to transmission of a positioning signal by a second terminal device for the positioning procedure. The second sidelink signal 18 may have been transmitted by one or more second terminal devices.

Figure 2:
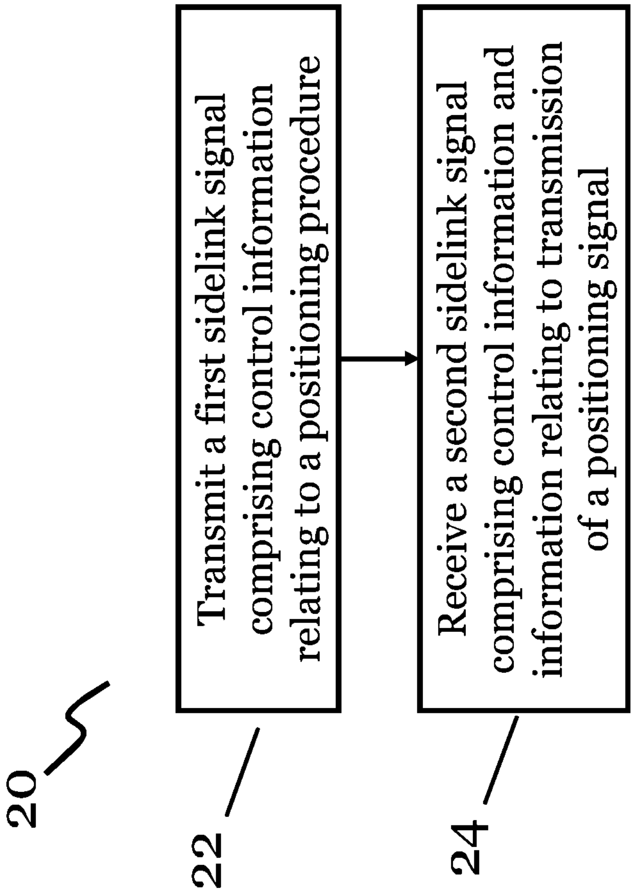
FIG. 2 is a flow diagram indicating processing operations that may be performed by the apparatus of FIG. 1, according to one or more example embodiments.

FIG. 2 is a flow diagram, referenced generally by 20. The flow diagram 20 indicates processing operations 22, 24 that may be performed by the apparatus 10 described in relation to FIG. 1, according to one or more example embodiments. The processing operations 22, 24 may be performed by hardware, software, firmware or a combination thereof.

A first operation 22 may comprise transmitting, to said one or more second terminal devices, a first sidelink signal comprising sidelink control information relating to said positioning procedure. The first sidelink signal may be the same or similar to first sidelink signal 14 described in relation to FIG. 1.

A second operation 24 may comprise receiving, from at least one of said one or more second terminal devices, a second sidelink signal comprising at least part of said sidelink control information, wherein said second sidelink signal further comprises information relating to transmission of a positioning signal by said respective second terminal device for said positioning procedure. The second sidelink signal may be the same or similar to second sidelink signal 18 described in relation to FIG. 1.

The apparatus 10 therefore provides efficient and low-latency resource allocation in sidelink positioning. For example, the apparatus 10 may coordinate resource allocation efficiently in terms of low overhead, low complexity, higher speeds and/or minimal delays. Furthermore, the apparatus 10 may be compatible with legacy sidelink physical layer sensing. For example, the 3GPP Radio Access Network (RAN) objectives of the updated Rel-18 work item description (RP-223549):

- Specify measurements to support Round Trip Time (RTT)-type solutions using sidelink (SL) signals for example SL-Angle of Arrival (SL-AoA), and SL-Time Difference of Arrival (TDOA) for RAN which may involve one or more of the following:
  - RAN1-Radio Layer 1 (Physical Layer);
  - RAN2-Radio Layer 2 and Radio Layer 3 Radio Resource Control (RRC).
- Specify support of resource allocation for SL PRS:
  - This may include resource allocation Scheme 1 and Scheme 2, where Scheme 1 corresponds to a network-centric SL PRS resource allocation and Scheme 2 corresponds to UE autonomous SL PRS resource allocation [RAN1].
- For resource allocation mechanism for SL PRS in Scheme 2, this may include:
  - Study and specify support of sensing-based resource allocation, and/or a random resource selection [RAN1].
  - Study and specify solutions for congestion control for SL PRS and/or inter-UE coordination for SL-PRS [RAN1].
  - Support resource allocation for shared resource pool with Rel-16/17/18 sidelink communication and dedicated resource pool for SL PRS [RAN1].
  - Specify signaling and associated UE behavior for support of unicast, groupcast (not including many to one) and broadcast of SL PRS transmissions [RAN1, RAN2].
  - Specify reporting signaling and procedures to facilitate support of SL positioning in all coverage scenarios and for PC5-only and joint PC5-Uu scenarios [RAN2, RAN3]:
  - Specify the protocol and procedures for SL positioning between UEs (Protocol for Sidelink positioning procedures (SLPP)).
  - Specify the protocol and procedures for SL positioning between UEs and LMF.
  - Specify signaling to NG-RAN for sidelink positioning.

Figure 3:
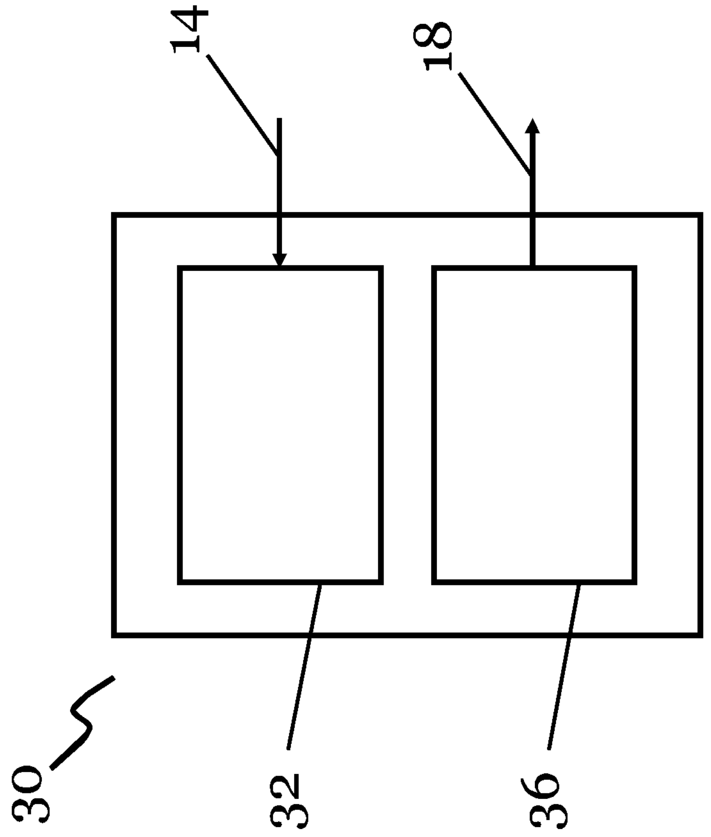
FIG. 3 illustrates an apparatus according to an example embodiment.

FIG. 3. illustrates an apparatus, referenced generally by 30; according to an example embodiment. The apparatus 30 may be used for positioning of a first terminal device (not shown) with respect to one or more second terminal devices (not shown) according to a positioning procedure.

The apparatus 30 comprises a means for receiving 32 a first sidelink signal 14; which may be the same or similar to the first sidelink signal 14 described in relation to FIG. 1. The first sidelink signal 14 may comprise sidelink control information relating to a positioning procedure.

The apparatus 30 further comprises a means for transmitting 36 a second sidelink signal 18; which may be the same or similar to the second sidelink signal 18 described in relation to FIG. 1. The second sidelink signal 18 may comprise at least part of the sidelink control information provided by the first sidelink signal 14. The second sidelink signal 18 may further comprise information relating to transmission of a positioning signal by a second terminal device for the positioning procedure.

Figure 4:
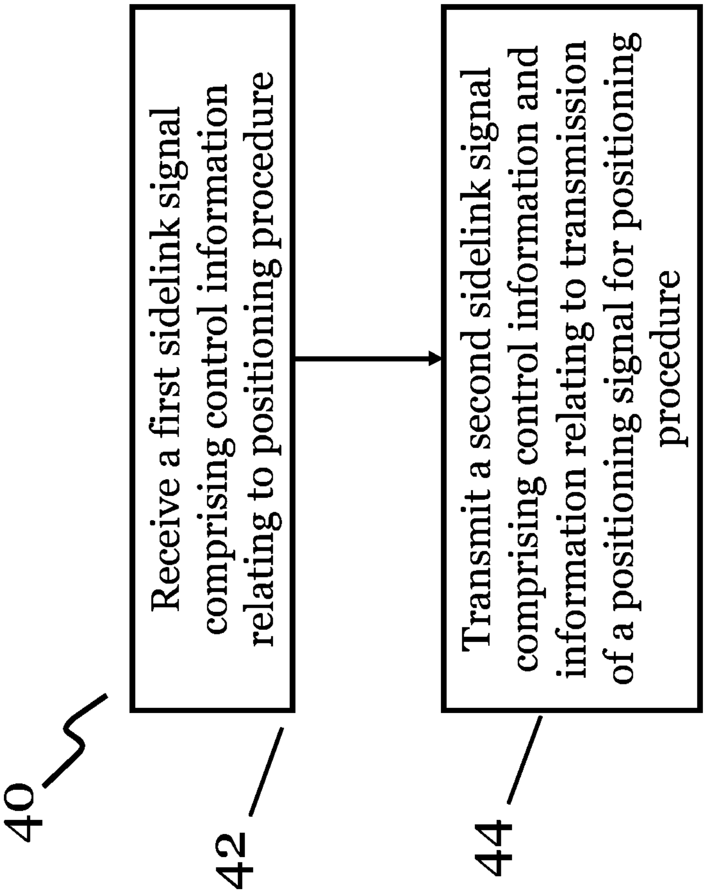
FIG. 4 is a flow diagram indicating processing operations that may be performed by the apparatus of FIG. 3; according to one or more example embodiments.

FIG. 4 is a flow diagram, referenced generally by 40. The flow diagram 40 indicates processing operations 42, 44 that may be performed by the apparatus 30 described in relation to FIG. 3, according to one or more example embodiments. The processing operations 42, 44 may be performed by hardware, software, firmware or a combination thereof.

A first operation 42 may comprise receiving a first sidelink signal (such as first sidelink signal 14) comprising sidelink control information relating to said positioning procedure.

A second operation 44 may comprise transmitting a second sidelink signal (such as second sidelink signal 18) comprising at least part of said sidelink control information, wherein said second sidelink signal further comprises information relating to transmission of a positioning signal by said respective second terminal device for said positioning procedure.

Figure 5:
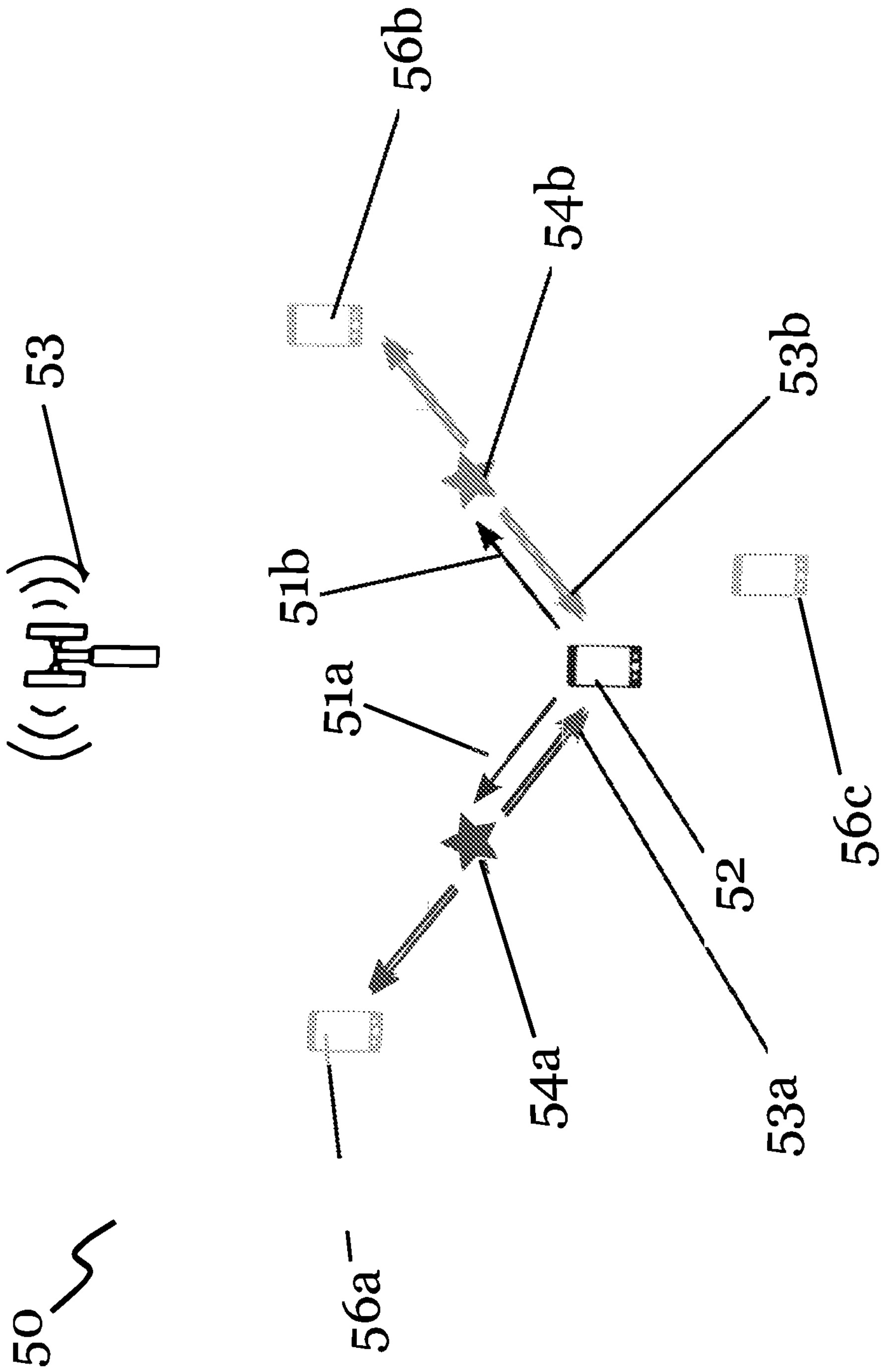
FIG. 5 illustrates an example embodiment of a system for positioning of a first terminal device with respect to one or more second terminal devices according to a positioning procedure.

FIG. 5 illustrates an example embodiment of a system; referenced generally by numeral 50. In some example embodiments, the system 50 may be used for positioning of a first (target) terminal device 52 with respect to a base station 53. For example, when the target device 52 is in coverage of the base station 53. In some examples, the base station 53 may be a 3G Node B (NB), 4G eNodeB (eNB). In some example, the base station 53 may be a 5G base station using New Radio (NR) technology sometimes referred to as a gNodeB (gNB). The system 50 may be used for positioning of a first (target) terminal device 52 with respect to two second (anchor) terminal devices 54*a*, 54*b* according to a positioning procedure. The first terminal device 52 may comprise an embodiment of the apparatus 10 described in relation to FIG. 1. The second terminal devices 54*a*, 54*b* may each comprise an embodiment of the apparatus 30 described in relation to FIG. 3.

In some example embodiments, the first terminal device 52 comprises a means for transmitting, to the second terminal devices 54*a*, 54*b*, a first sidelink signal 51*a*, 51*b*. The first sidelink signal 51*a*, 51*b* comprises sidelink control information relating to a positioning procedure.

The first terminal device 52 controls resource reservation for the positioning procedure. The first sidelink signal 51*a*, 51*b* indicates to any suitable anchor devices 54*a*, 54*b* the resource reservation. In some embodiments, no conventional data is exchanged over the PSSCH from the first terminal device 52 during the positioning procedure.

In some embodiments, the first sidelink signal 51*a*, 51*b* may be a 5G SCI Stage 1 signal; as discussed above. In some embodiments, the first sidelink signal 51*a*, 51*b* may be a 5G SCI stage 2 signal; as discussed above. In other embodiments, the first sidelink signal 51*a*, 51*b* may be a 5G SCI stage 1 and stage 2 signal.

In some embodiments, two second terminal devices 54*a*, 54*b* along with other terminal devices 56*a*, 56*b*, 56*c* are configured for sensing of SCI signals thus comprise a means for receiving the first sidelink signal 51*a*, 51*b*; as described above. The second terminal devices 54*a*, 54*b* may be available to act as anchor devices; whereas the other terminal devices 56*a*, 56*b*, 56*c* remain as sensing UEs.

The second terminal devices 54*a*, 54*b* further comprise a means for transmitting a second sidelink signal 53*a*, 53*b* comprising at least part of the sidelink control information (in the first sidelink signal 51*a*, 51*b*). The second sidelink signal 53*a*, 53*b* further comprises information relating to transmission of a positioning signal (not shown) by the respective second terminal device 54*a*, 54*b* for the positioning procedure.

In some embodiments, the second sidelink signal 53*a*, 53*b* may be a 5G SCI Stage 1 signal; as discussed above. In other embodiments, the second sidelink signal 53*a*, 53*b* may be a 5G SCI stage 2 signal; as discussed above. In other embodiments, the second sidelink signal 53*a*, 53*b* may be a 5G SCI stage 1 and stage 2 signal. In some embodiments, the second sidelink signal 53*a*, 53*b* may mirror the information (or part of the information) in the first sidelink signal 51*a*, 51*b*.

In some example embodiments, the first terminal device 52 comprises a means for receiving, from at least one of said second terminal devices 54*a*, 54*b*, the second sidelink signal 53*a*, 53*b* as described above.

Figure 6:
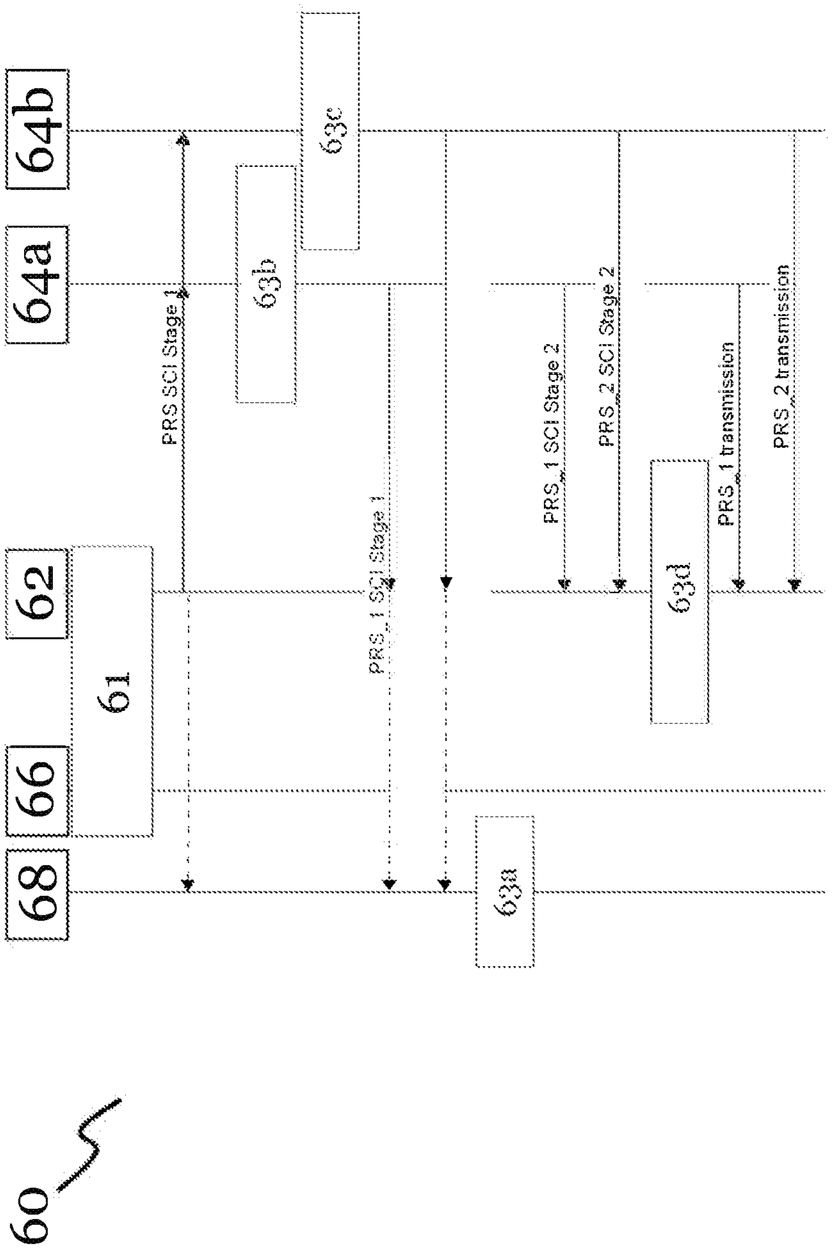
FIG. 6 illustrates a message flow sequence for a target UE and two anchor UEs in a positioning procedure according to one or more example embodiments.

FIG. 6 illustrates a message flow sequence for a positioning procedure, referenced generally by 60, in accordance with one or more example embodiments. The sequence 60 may be used for OTDOA positioning of a first terminal device (target UE 62) with respect to two second terminal devices (anchor UE 1 64*a* and anchor UE 2 64*b*).

As per the 3GPP standard, all sidelink UEs 62, 64*a*, 64*b* engage in "SCI sensing" to monitor channel sharing and resource allocation by other UEs. In addition, a LMF/Server UE 66 may be used to provide assistance data to the target UE 62.

In some embodiments, the target UE 62 may be assisted by the LMF/Server UE 66 to coordinate the transmissions of each anchor UE 64*a*, 64*b* by allocating each a specific Positioning Reference Signal (PRS) in a shared time slot.

The target UE 62 and LMF/Server UE 66 may request an OTDOA positioning procedure 61 [session ID "POS", priority "P"]. The session ID "POS" may be known from the LMF/Server UE 66 via assistance data. Wherein P represents the session priority.

The target UE 62 may subsequently transmit a first sidelink signal to anchor UE 1 64*a* and anchor UE 2 64*b*. The first sidelink signal may comprise a "PRS SCI Stage 1" signal comprising information [PRS resources "TxBw", priority "2P", format "?"]. The "PRS SCI Stage 1" signal may comprise a resource block reservation "PRS resources" for said positioning signals. Providing an apparatus (such as a target UE) reserve a block of resources for the positioning procedure may provide a more resource efficient or faster approach to resource coordination; for example compared to unicast communications with individual anchors. For example, "PRS resources" may define a time-frequency resource block "TxBw" defining slot "T" and bandwidth "Bw" for the positioning procedure. The "PRS SCI Stage 1" signal may further comprise a priority "priority" of said positioning procedure. In some embodiments, "priority" of said positioning procedure is a function of a number of said second terminal devices. For example, the priority "2P" may be determined as "number of involved anchors" multiplied by the "session priority P" therefore providing a cumulative priority. The "PRS format" may be left unspecified; for example, the "PRS format" comprises a blank information element, or a reserved value.

The anchor UEs 64*a*, 64*b* may receive the first sidelink signal comprising "PRS SCI Stage 1" signal. The anchor UEs 64*a*, 64*b* may identify an association which may be based on the session ID "POS" 63*b*, 63*c*. In response, the anchor UEs 64*a*, 64*b* may each transmit a second sidelink signal which may comprise a "PRS_1 SCI Stage 1" and "PRS_2 SCI Stage 1" signals respectively in time slot "T". The "PRS_1 SCI Stage 1" and "PRS_2 SCI Stage 1" signals may mirror the information in the "PRS SCI Stage 1" signal i.e. [PRS resources "TxBw", priority "2P"] in slot "T" and bandwidth "Bw". In addition, the "PRS_1 SCI Stage 1" and "PRS_2 SCI Stage 1" signals may further comprise information relating to their own "PRS format" of a positioning signal to be transmitted by the respective second terminal device for the positioning procedure. The "PRS format" may be labelled "F1" and "F2" for anchor UE 64*a* and anchor UE 64*b* respectively. The "PRS formats" may be determined according to assistance data from LMF/server UE 66 or based on sensing the SCIs of other UEs and selection of orthogonal PRS formats. Other sensing UEs 68 on the network may be aware of the transmission due to the stage 1 SCI mirroring 63*a*.

In some embodiments, the second sidelink signals transmitted by the anchor UEs 64*a*, 64*b* may further comprise information relating to identification of the source (SRC) and Destination (DST) of said second sidelink signals. For example, the second sidelink signals may comprise "PRS_1 SCI Stage 2" and "PRS_2 SCI Stage 2" signals respectively. Identification of source and destination may enable the apparatus (e.g. the target UE 62) to confirm the success of it's initial allocation "request" to the anchor UEs 64*a*, 64*b*. For example, the "PRS_1 SCI Stage 2" and "PRS_2 SCI Stage 2" signals may comprise identification of the source and destination. For example, the source may be the respective anchor UEs 64*a*, 64*b* and the destination may be the target UE 62. For example, the information from anchor UE 1 64*a* may be [SRC="A UE 1", DST="T UE"]. For example, the information from anchor UE 2 64*b* may be [SRC="A UE 2", DST="T UE"].

The target UE 62 may use SCI monitoring to confirm the success of its initial allocation 63*d* "request" to anchor UEs 64*a*, 64*b* i.e. [session ID "POS", priority "P"]. Furthermore, the target UE 63 may use SCI monitoring to determine the "PRS formats" "F1" and "F2" from anchor UEs 64*a*, 64*b* respectively.

The anchor UEs 64*a*, 64*b* may then transmit their respective PRS in the indicated resources and format. For example, the PRS from anchor UE 1 64*a* may take the form PRS_1 transmission [resources "TxBw", format "F1"]. For example, the PRS from anchor UE 2 64*b* may take the form PRS_2 transmission [resources "TxBw", format "F2"].

The target UE 62 may further comprise means for receiving, from one or more of said second terminal devices i.e. anchor UEs 64*a*, 64*b* the respective positioning signal(s) i.e. PRS_1 transmission and/or PRS_2 transmission.

Figure 7:
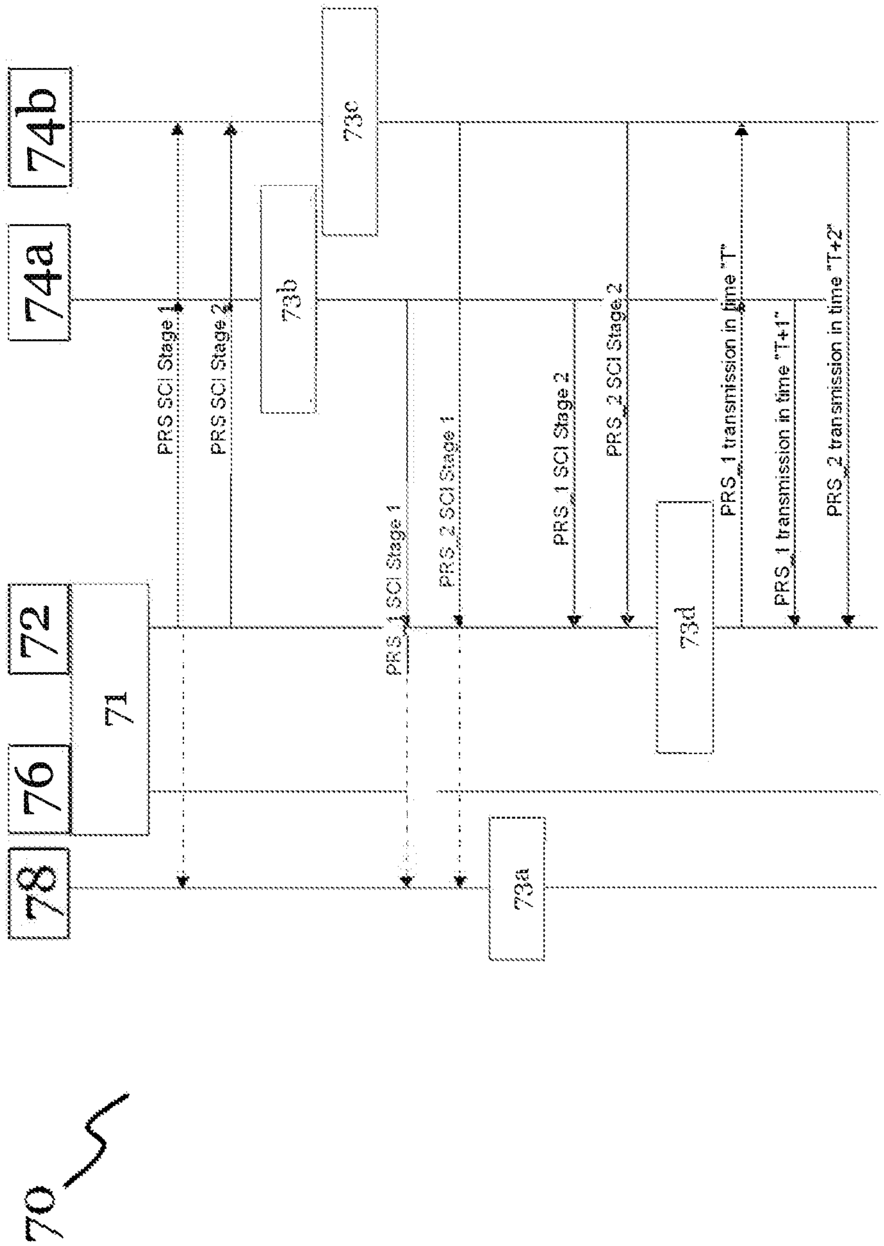
FIG. 7 illustrates a message flow sequence for a target UE and two anchor UEs in a positioning procedure according to one or more example embodiments.

FIG. 7 illustrates a message flow sequence for a positioning procedure, referenced generally by 70, in accordance with one or more example embodiments. The sequence 70 may be used for multi-RTT positioning of a first terminal device (target UE 72) with respect to two second terminal devices (anchor UE 1 74*a* and anchor UE 2 74*b*). In some embodiments, the anchor UEs 74*a*, 74*b* and target UE 72 may need to allocate and transmit a PRS for multi-RTT positioning. The sidelink UEs 72, 74*a*, 74*b* may be the same or similar to all sidelink UEs 62, 64*a*, 64*b* described above in relation to FIG. 6.

As per the 3GPP standard, all sidelink UEs 72, 74*a*, 74*b* engage in "SCI sensing" to monitor channel sharing and resource allocation by other UEs. In addition, a LMF/Server UE 76 may be used to provide assistance data to the target UE 72.

The target UE 72 and LMF/Server UE 76 may request a multi-RTT positioning procedure 71. The target UE 72 may transmit a first sidelink signal to anchor UE 1 74*a* and anchor UE 2 74*b*. 5. The first sidelink signal may comprise information relating to transmission of a second positioning signal by said target UE 72 for said positioning procedure thus enabling RTT based positioning. For example, the second positioning signal may be PRS_1 transmission in time "T".

The first sidelink signal may comprise a "PRS SCI Stage 1" signal comprising information [PRS resources "[T:T+2] xBw", priority "3P", format "f0"]. The "PRS SCI Stage 1" signal may comprise a resource block reservation "PRS resources" for said positioning signals. A resource block reservation "PRS resources" may comprise time slot reservations for transmission of each of said positioning signals to coordinate transmission of multiple UEs and anchor UEs. For example, "PRS resources" may define a time-frequency resource block "[T:T+2]xBw" to accommodate for the need for multiple transmission. Wherein "[T:T+2]xBw" indicates the intention to reserve time slots "T", "T+1", "T+2" (or "T:T+2" for short) and bandwidth "Bw" for the target UE 72, anchor UE 74*a* and anchor UE 74*b* respectively for the positioning procedure.

The "PRS SCI Stage 1" signal may comprise a priority "priority" of said positioning procedure. In some embodiments, "priority" of said positioning procedure is a function of a number of said second terminal devices. For example, the priority may be determined as "number of involved anchors" multiplied by the "session priority P". Thus, the "priority" may be "3P" in this example because the target UE 72, anchor UE 74*a* and anchor UE 74*b* each transmit a PRS. For example, PRS 0 may be transmitted by target UE 72 in time T, PRS 1 may be transmitted by anchor UE 1 in time T+1, PRS 2 may be transmitted by anchor UE 2 in time T+2.

The "PRS format" may be left unspecified; for example, the "PRS format" comprises a blank information element, or a reserved value. In some embodiments, the "PRS format" is left unspecified by the target UE 72. Wherein the target UE 72 may use SCI to coordinate it's own PRS. Wherein the anchor UEs 74*a*, 74*b* may use SCI to coordinate their own PRS. In some embodiments, "PRS format" is "F0" which may indicate (permit) the usage of multiple PRS formats by one or more UEs 72, 74*a*, 74*b*.

In some embodiments, the first sidelink signal transmitted by the target UE may further comprise information relating to identification of the source (SRC) and Destination (DST) of said second sidelink signals. For example, the first sidelink signal may comprise a "PRS SCI Stage 2" signal. For example, the "PRS SCI Stage 2" signal may comprise identification of the source and destination. For example, the source may be the target UE 72. For example, the destination may be unknown. For example, "PRS SCI Stage 2" signal may comprise [SRC="T UE", DST="?"].

The anchor UEs 74*a*, 74*b* may receive the first sidelink signal comprising "PRS SCI Stage 1" and "PRS SCI Stage 2". The anchor UEs 74*a*, 74*b* may identify an association 73*b*, 73*c* with the positioning procedure based on the source; which may be defined in the "PSR SCI Stage 2". In response, the anchor UEs 74*a*, 74*b* may transmit a second sidelink signal in time slots [T+1] and [T+2] respectively. The second sidelink signals may comprise "PRS_1 SCI Stage 1" and "PRS_2 SCI Stage 1" signals. The "PRS_1 SCI Stage 1" and "PRS_2 SCI Stage 1" signals may mirror the information in the "PRS SCI Stage 1" in their respective time slot i.e. [PRS resources "[T+1]xBw", priority "3P"] and [PRS resources "[T+2]xBw", priority "3P"].

In some embodiments, a raised priority may indicate to anchor UE 74*a*, 74*b* a pre-reservation grant for UEs associated with the target UE 72. In some embodiments, an absence of destination UE in the "PRS SCI Stage 2" signal may indicate to anchor UE 74*a*, 74*b* a pre-reservation grant for UEs associated with the target UE 72 (which may be indicated in the "PRS SCI Stage 2" signal as the Stage 2 SCI source node).

In some embodiments, the "PRS_1 SCI Stage 1" and "PRS_2 SCI Stage 1" signals may comprise indications of their own "PRS formats". The "PRS format" may be labelled "F1" and "F2" for anchor UE 74*a* and anchor UE 74*b* respectively. The anchor UE 74*a*, 74*b* may use the same resources and priority as the target UE 72.

Other sensing UEs 78 on the network may be aware of the transmissions due to the stage 1 SCI mirroring 73*a*.

In some embodiments, the second sidelink signals transmitted by the anchor UEs 74*a*, 74*b* may further comprise information relating to identification of the source (SRC) and Destination (DST) of said second sidelink signals. For example, the source may be the respective anchor UEs 74*a*, 74*b* and the destination may be the target UE 72. For example, the information from anchor UE 1 74*a* may be [SRC="A UE 1", DST="T UE"]. For example, the information from anchor UE 2 74*b* may be [SRC="A UE 2", DST="T UE"].

The target UE 72 may use SCI monitoring 73*d* to confirm the success of its initial allocation "request" to anchor UEs 74*a*, 74*b*. Furthermore, the target UE 72 may use SCI monitoring to determine the "PRS formats" "F1" and "F2" from anchor UEs 74*a*, 74*b* respectively.

The anchor UEs 74*a*, 74*b* may then transmit their respective PRS in the indicated resources, format and time slot. For example, the PRS from target UE 72 may take the form PRS_1 transmission in time "T" [resources "[T]xBw", format "F0"]. For example, the PRS from anchor UE 1 74*a* may take the form PRS_1 transmission in time "T+1" [resources "[T+1]xBw", format "F1"]. For example, the PRS from anchor UE 2 74*b* may take the form PRS_2 transmission in time "T+2" [resources "[T+2]xBw", format "F2"].

The target UE 72 may further comprise means for transmitting, to one or more of said second terminal devices i.e. anchor UEs 74*a*, 74*b*, said second positioning signal i.e. PRS_1 transmission in time "T".

The anchor UEs 74*a*, 74*b* may each comprise means for receiving, from one or more of target devices i.e. target UE 72 the positioning signal for example PRS_1 transmission in time "T".

The target UE 72 may further comprise means for receiving, from one or more of said second terminal devices i.e. anchor UEs 74*a*, 74*b* the respective positioning signal(s) i.e. PRS_1 transmission in time "T+1" and/or PRS_2 transmission in time "T+2".

Figure 8:
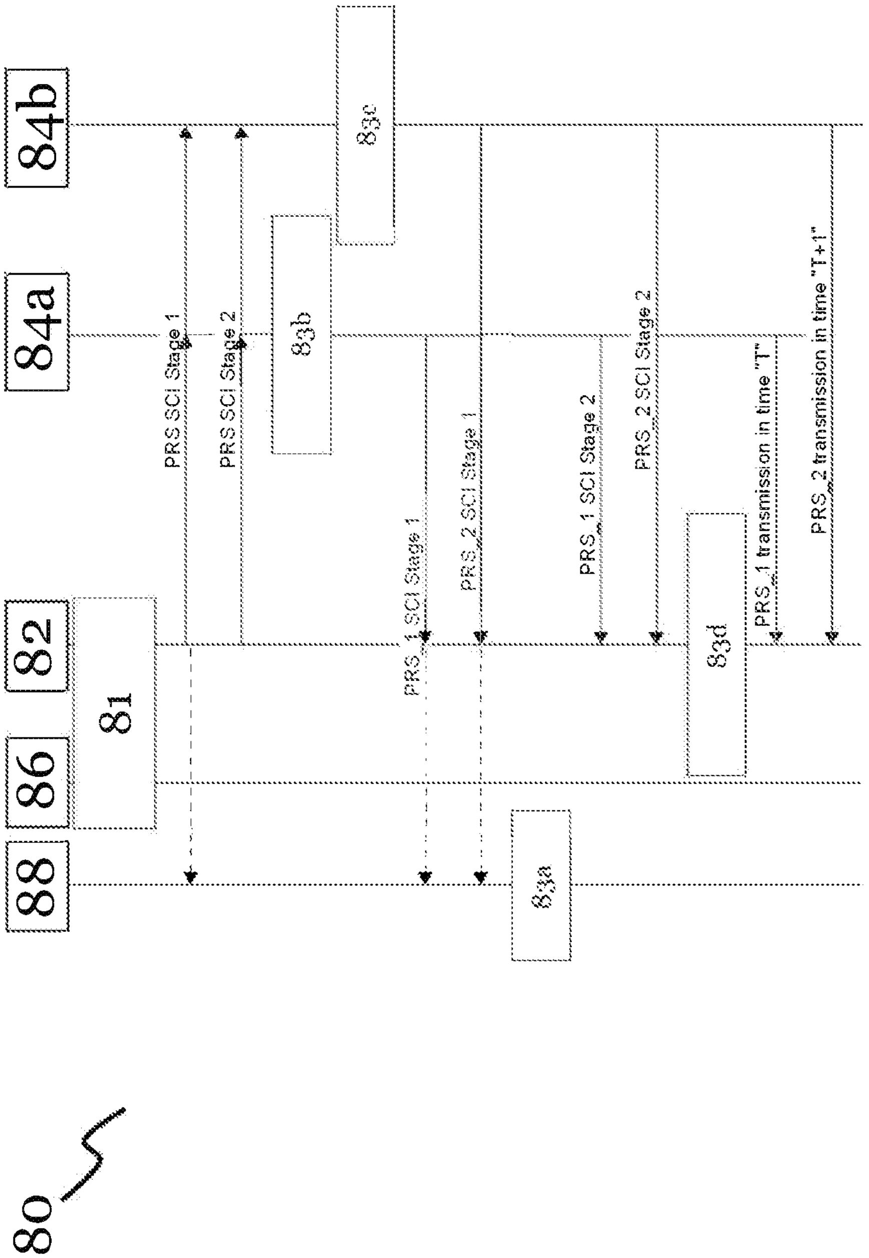
FIG. 8 illustrates a message flow sequence for a target UE and two anchor UEs in a positioning procedure according to one or more example embodiments.

FIG. 8 illustrates a message flow sequence for a positioning procedure, referenced generally by 80, in accordance with one or more example embodiments. The sequence 80 may be used for AoA positioning of a first terminal device (target UE 82) with respect to two second terminal devices (anchor UE 1 84*a* and anchor UE 2 84*b*). The sidelink UEs 72, 74*a*, 74*b* may be the same or similar to all sidelink UEs described above in relation to FIG. 6 and/or FIG. 7.

As per the 3GPP standard, all sidelink UEs 82, 84*a*, 84*b* engage in "SCI sensing" to monitor channel sharing and resource allocation by other UEs. In addition, a LMF/Server UE 86 may be used to provide assistance data to the target UE 82.

The target UE 82 and LMF/Server UE 86 may request an AoA positioning procedure 81. The target UE 82 may transmit a first sidelink signal to anchor UE 1 84*a* and anchor UE 2 84*b*. The first sidelink signal may comprise a "PRS SCI Stage 1" signal comprising information [PRS resources "[T:T+1]xBw", priority "2P", format "F"]. The "PRS SCI Stage 1" signal may comprise a resource block reservation "PRS resources" for said positioning signals. A resource block reservation "PRS resources" may comprise time slots reservations for transmission of each of said positioning signals. For example, "PRS resources" may define a time-frequency resource block "[T:T+1]xBw" to accommodate for the need for multiple transmission. Wherein "[T:T+1]xBw" indicates the intention to reserve time slots "T", "T+1" (or "T: T+1" for short) and bandwidth "Bw" for the anchor UE 84*a* and anchor UE 84*b* respectively for the positioning procedure.

The "PRS SCI Stage 1" signal may comprise a priority "priority" of said positioning procedure. In some embodiments, "priority" of said positioning procedure is a function of a number of said second terminal devices. For example, the priority may be determined as "number of involved anchors" multiplied by the "session priority P". Thus, the "priority" may be "2P" in this example because the anchor UE 84*a* and anchor UE 84*b* each transmit a PRS. For example, PRS 1 may be transmitted by anchor UE 1 84*a* in time T, PRS 2 may be transmitted by anchor UE 2 in time T+1. In some embodiments, "priority" of said positioning procedure is a function of a number of said second terminal devices and PRS repetitions for example the total 'volume' of resources to be allocated.

In some embodiments, the "PRS format" is specified for all PRS by the target UE 82 for example, the "PRS format" may be "F".

In some embodiments, the first sidelink signal transmitted by the target UE 82 may further comprise information relating to identification of the source (SRC) and Destination (DST) of said second sidelink signals. For example, the first sidelink signal may comprise a "PRS SCI Stage 2" signal. For example, the "PRS SCI Stage 2" signal may comprise identification of the source and destination. For example, the source may be the target UE 82. For example, the destination may be unknown. For example, "PRS SCI Stage 2" signal may comprise [SRC="T UE", DST="?"].

The anchor UEs 84*a*, 84*b* may receive the first sidelink signal comprising "PRS SCI Stage 1" and "PRS SCI Stage 2". The anchor UEs 84*a*, 84*b* may identify an association 83*b*, 83*c* with the positioning procedure 81 based on the "PRS format"; which may be defined in "PRS SCI Stage 2" signal for example "PRS format" may be "F". In response, the anchor UEs 84*a*, 84*b* may transmit a second sidelink signal in time slots [T] and [T+1] respectively. The second sidelink signals may comprise "PRS_1 SCI Stage 1" and "PRS_2 SCI Stage 1" signals.

In some embodiments, the anchor UEs 84*a*, 84*b* allocate their PRS in a distributed manner using own SCI messages. In some embodiments, the "priority" of the PRS can be progressively raised to ensure that all anchors of a given target UE are allocated the needed resources and the positioning session is not impacted by one or more UE being unable to allocate resources due to conflict with other UEs with low/moderate priority. For example, the "PRS_1 SCI Stage 1" and "PRS_2 SCI Stage 1" signals may comprise [PRS resources "[T]xBw", priority "2P"] and [PRS resources "[T+1]xBw", priority "3P"].

In some embodiments, a raised priority may indicate to anchor UE 84*a*, 84*b* a pre-reservation grant for UEs associated with the target UE 82. In some embodiments, an absence of destination UE in the "PRS SCI Stage 2" signal may indicate to anchor UE 84*a*, 84*b* a pre-reservation grant for UEs associated with the target UE 82 (which may be indicated in the "PRS SCI Stage 2" signal as the Stage 2 SCI source node).

Other sensing UEs 88 on the network may be aware 83*a* of the transmissions due to the stage 1 SCI mirroring.

In some embodiments, the second sidelink signals transmitted by the anchor UEs 84*a*, 84*b* may further comprise information relating to identification of the source (SRC) and Destination (DST) of said second sidelink signals. For example, the source may be the respective anchor UEs 84*a*, 84*b* and the destination may be the target UE 82. For example, the information from anchor UE 1 84*a* may be [SRC="A UE 1", DST="T UE"]. For example, the information from anchor UE 2 84*b* may be [SRC="A UE 2", DST="T UE"].

The target UE 82 may use SCI monitoring 83*d* to confirm the success of its initial allocation "request" to anchor UEs 84*a*, 84*b*. Furthermore, the target UE 82 may use SCI monitoring to confirm the allocation of PRS_1 and PRS_2 from anchor UEs 84*a*, 84*b* respectively.

The anchor UEs 84*a*, 84*b* may then transmit their respective PRS in the indicated resources, format and time slot. For example, the PRS from anchor UE 1 84*a* may take the form PRS_1 transmission in time "T" [resources "[T]xBw", format "F"]. For example, the PRS from anchor UE 2 84*b* may take the form PRS_2 transmission in time "T+1" [resources "[T+1]xBw", format "F"].

The target UE 82 may further comprise means for receiving, from one or more of said second terminal devices i.e. anchor UEs 84*a*, 84*b* the respective positioning signal(s) i.e. PRS_1 transmission in time "T" and/or PRS_2 transmission in time "T+1".

In some embodiments, Mode 2 resource allocation can be configured under in-coverage or partial coverage scenarios. In some embodiments, the UEs are allocated PRS resources with the central assistance of a base station (gNB). In some embodiments, the gNB is the original source of PRS allocation request. In some embodiments, the gNB allocation request comprises an indication (for example to the target UE) of the PRS resources in use. In some example embodiments, the gNB may issue the first resource indication (for example bandwidth, time slot, format). The target UE may use this information to generate its own first sidelink signals for example comprising a "PRS Stage 1 SCI" signal. In some embodiments, any of the above examples could continue as described following this "PRS Stage 1 SCI" signal.

In some embodiments, no conventional data (PSSCH) is transmitted by the target UE 62, 72, 82 during the positioning procedure 60, 70, 80. In some embodiments, only transmission of PRS signals occurs during the positioning procedure 60, 70, 80.

In some embodiments, the target UE 62, 72, 82 uses only stage 1 SCI during the positioning procedure 60, 70, 80. In some embodiments the stage 1 SCI comprises a positioning related parameter, for example one or more of:

- cumulative priority, preferably derived from positioning application/session/group/process/UE properties including positioning anchor number;
- positioning application/session/group/process/UE identifier;

specific resource block(s) such as pre-defined and pre-configured resource blocks.

In some embodiments, the target UE 62, 72, 82 uses both stage 1 and stage 2 SCI during the positioning procedure 60, 70, 80. In some embodiments the stage 2 SCI comprises a blank information element relating to a positioning related parameter, for example one or more of:

source ID unspecified (e.g., the associated information element is "blank" or "reserved");

destination ID set to (target UE);

transmission format unspecified (e.g., the associated information element is "blank" or "reserved").

In some embodiments, the anchor UEs 64, 74, 84 identify association with the above signaling by the target UE 62, 72, 82. In some embodiments, the presence of specific positioning-related parameter and/or absence of other parameters in Stage 1 and/or 2 SCI by UE 1 (target UE) is used, for example:

destination ID;

application/session/group/process/UE properties and/or identifier;

reference to specific resource block(s) such as pre-defined and pre-configured resource blocks;

reference to specific PRS format.

In some embodiments, the network UE(s) respond to the above target UE 62, 72, 82 signaling using their own legacy SCI signaling. In some embodiments, the anchor UEs 64, 74, 84 indicate:

same time-frequency resources, and/or same or higher (cumulative) priority, and/or same or related PRS transmission format as in the Stage 1 SCI by target UE 62, 72, 82.

In some embodiments, multiple UEs contend for a multi-slot initial reservation by target UE 62, 72, 82, for example:

at least one of them is target UE 62, 72, 82 itself;

at least one of them is anchor UE 64, 74, 84;

all of them are anchor UE 64, 74, 84.

In some embodiments, mutually orthogonal PRS formats are specified. In some embodiments, a multitude of UEs (for example only anchor UEs 64, 74, 84) contend for SCI transmission using channel/SCI sensing. In some embodiments, the target UE 62, 72, 82 may have special position or priority in this process; for example, when multi-RTT positioning is used.

In some embodiments, the target UE 62, 72, 82 uses SCI information from anchor UE 64, 74, 84 to confirm the PRS resource allocation with respect to own initial signaling.

In some embodiments, network UE(s) conclude resource allocation. In some embodiments, legacy Stage 2 SCI is sent by the target UE 62, 72, 82 and/or anchor UE 64, 74, 84; depending on positioning method used. For example:

For OTDOA/AoA and similar, legacy Stage 2 SCI is sent only by the anchor UE 64, 74, 84.

For multi-RTT and similar, legacy Stage 2 SCI is also sent by the target UE 62, 72, 82.

In some embodiments, target UE 62, 72, 82 uses SCI information from anchor UE 64, 74, 84 to confirm/update the PRS resource allocation with respect to own initial signaling.

Example Apparatus

Figure 9:
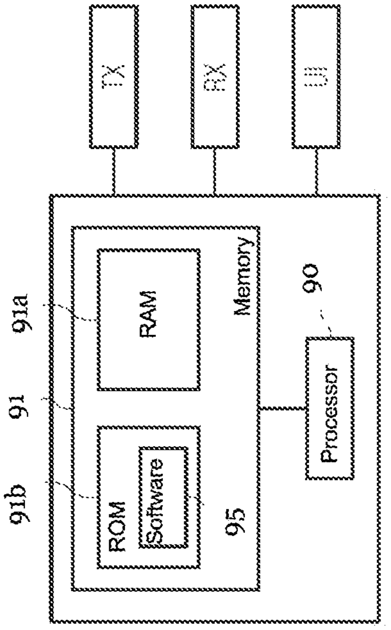
FIG. 9 illustrates an apparatus according to some example embodiments.

FIG. 9 shows an apparatus according to some example embodiments, which may comprise the user terminal 91. The apparatus may be configured to perform the operations described herein, for example operations described with reference to any disclosed process. The apparatus comprises at least one processor 90 and at least one memory 91 directly or closely connected to the processor. The memory 91 includes at least one random access memory (RAM) 91*a* and at least one read-only memory (ROM) 91*b*. Computer program code (software) 95 is stored in the ROM 91*b*. The apparatus may be connected to a transmitter (TX) and a receiver (RX). The apparatus may, optionally, be connected with a user interface (UI) for instructing the apparatus and/or for outputting data. The at least one processor 90, with the at least one memory 91 and the computer program code 95 are arranged to cause the apparatus to at least perform at least the method according to any preceding process, for example as disclosed in relation to the flow diagrams of FIGS. 1 and/or 4 and related features thereof.

Figure 10:
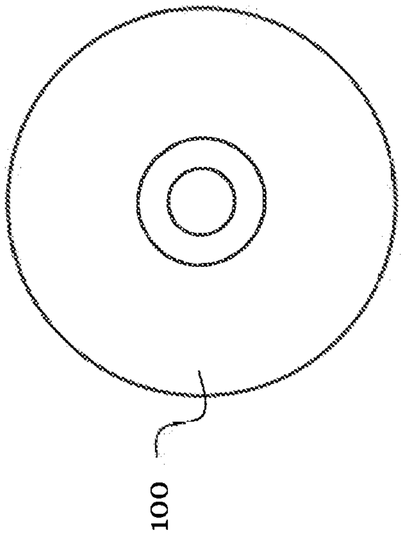
FIG. 10 illustrates a non-transitory media according to some example embodiments.

FIG. 10 shows a non-transitory media 100 according to some embodiments. The non-transitory media 100 is a computer readable storage medium. It may be e.g. a CD, a DVD, a USB stick, a blue ray disk, etc. The non-transitory media 100 stores computer program code, causing an apparatus to perform the method of any preceding process for example as disclosed in relation to the flow diagrams and related features thereof.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi.

A memory may be volatile or non-volatile. It may be e.g. a RAM, a SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus comprising: at least one processor; and at least one memory including computer program code which, when executed by the at least one processor, causes the apparatus to:

transmit, to one or more second terminal devices, a first sidelink signal comprising control information relating to a positioning procedure of a first terminal device, and receive, from at least one of said one or more second terminal devices, a second sidelink signal comprising at least part of said control information, wherein said second sidelink signal further comprises information relating to transmission of a positioning signal by said respective second terminal device for said positioning procedure, wherein said first sidelink signal comprises a Sidelink Control Information (SCI) Stage 1 signal comprising a PRS format comprising at least one of: an unspecified value, a blank information element, or a reserved value, wherein said second sidelink signal mirrors at least part of the information in the first sidelink signal and further comprises an indication of a Positioning Reference Signal (PRS) format of the positioning signal determined by said respective second terminal device for the positioning procedure, and wherein the at least one memory including computer program code which, when executed by the at least one processor, further causes the apparatus to: monitor SCI from the one or more second terminal devices to confirm a success of a resource allocation for the positioning procedure and to determine respective PRS format(s) of the one or more second terminal devices.

2. The apparatus according to claim 1, wherein said first sidelink signal further comprises information relating to transmission of a second positioning signal by said first terminal device for said positioning procedure.

3. The apparatus according to claim 1, wherein said first and/or second sidelink signal further comprises information relating to identification of said respective second terminal device and/or identification of said first terminal device.

4. The apparatus according to claim 1, wherein the at least one processor; and the at least one memory including computer program code which, when executed by the at least one processor, further causes the apparatus to:

receive, from one or more of said second terminal devices, said respective positioning signal(s).

5. The apparatus according to claim 1, wherein said respective second terminal device determines the PRS format based on at least one of: assistance data from a Location Management Function (LMF) or server UE, or sensing of SCIs of other UEs and selection of a mutually orthogonal PRS format.

6. The apparatus according to claim 1, wherein said one or more second terminal devices identify an association with the positioning procedure based on at least one of: a positioning session identifier, a source identifier in a Stage 2 SCI, or an absence of a destination identifier in a Stage 2 SCI transmitted by the first terminal device, and wherein at least one of: a raised priority in the second sidelink signal or the absence of a destination identifier in a Stage 2 SCI of the first sidelink signal indicates a pre-reservation grant for UEs associated with the first terminal device.

7. The apparatus according to claim 1, wherein one or more other terminal devices configured for sensing of SCI signals are made aware of a resource reservation for the positioning procedure by receiving the second sidelink signal from the one or more second terminal devices that mirrors at least part of the first sidelink signal, and wherein no conventional data is transmitted over a Physical Sidelink Shared Channel (PSSCH) from the first terminal device during the positioning procedure.

8. The apparatus according to claim 1, wherein a priority of the PRS of the one or more second terminal devices is progressively raised to ensure that all second terminal devices of the first terminal device are allocated needed resources for the positioning procedure, such that the positioning procedure is not impacted by one or more UEs being unable to allocate resources due to conflict with other UEs with low or moderate priority.

9. The apparatus according to claim 1, wherein multiple UEs contend for a multi-slot initial reservation by the first terminal device using channel or SCI sensing, and wherein the first terminal device has a special position or priority in the contention process.

10. The apparatus according to claim 1, wherein the first terminal device transmits only Stage 1 SCI during the positioning procedure, and wherein said Stage 1 SCI comprises: a cumulative priority derived from positioning properties including a number of positioning anchors, and a positioning application, session, group, process, or UE identifier.

11. The apparatus according to claim 1, wherein the one or more second terminal devices respond to the first sidelink signal using their own legacy SCI signaling indicating at least: the same time-frequency resources as in the first sidelink signal, the same or higher cumulative priority as in the first sidelink signal, and the same or a related PRS transmission format as in the first sidelink signal.

12. The apparatus according to claim 1, wherein for an OTDOA or AoA positioning procedure, legacy Stage 2 SCI is sent only by the one or more second terminal devices, and for a multi-RTT positioning procedure, legacy Stage 2 SCI is sent by both the first terminal device and the one or more second terminal devices.

13. The apparatus according to claim 1, wherein a base station provides an initial resource indication comprising at least one of bandwidth, time slot, or format to the first terminal device, and wherein the first terminal device uses said initial resource indication to generate the first sidelink signal.

14. The apparatus according to claim 1, wherein the at least one memory including computer program code which, when executed by the at least one processor, further causes the apparatus to: update the PRS resource allocation with respect to own initial signaling based on SCI information from the one or more second terminal devices, wherein the updating is performed prior to reception of the respective positioning signal(s) from the one or more second terminal devices.

15. The apparatus according to claim 14, wherein:

no conventional data is transmitted over a Physical Sidelink Shared Channel (PSSCH) from the first terminal device during the positioning procedure;

said one or more second terminal devices identify an association with the positioning procedure based on at least one of a positioning session identifier or a source identifier in a Stage 2 SCI;

the respective second terminal device determines the PRS format based on sensing of SCIs of other UEs and selection of a mutually orthogonal PRS format;

one or more other terminal devices configured for sensing of SCI signals are made aware of the resource reservation for the positioning procedure by receiving the second sidelink signal that mirrors at least part of the first sidelink signal;

a priority of the PRS of the one or more second terminal devices is progressively raised to ensure that all second terminal devices are allocated needed resources; and for an OTDOA or AoA positioning procedure, legacy Stage 2 SCI is sent only by the one or more second terminal devices.

16. The apparatus according to claim 1, wherein the Stage 1 SCI comprises a reference to specific pre-defined and pre-configured resource blocks for the positioning procedure.

17. The apparatus according to claim 1, wherein a Stage 2 SCI transmitted by the first terminal device during the positioning procedure comprises at least one of: a source ID set to an unspecified value, or a destination ID set to the first terminal device.

18. An apparatus comprising: at least one processor; and at least one memory including computer program code which, when executed by the at least one processor, causes the apparatus to:

receive a first sidelink signal comprising control information relating to a positioning procedure of a first terminal device, and transmit a second sidelink signal comprising at least part of said control information, wherein said second sidelink signal further comprises information relating to transmission of a positioning signal by said respective second terminal device for said positioning procedure, wherein the first sidelink signal comprises a Sidelink Control Information (SCI) Stage 1 signal comprising a PRS format comprising at least one of: an unspecified value, a blank information element, or a reserved value, wherein said second sidelink signal mirrors at least part of the information in the first sidelink signal and further comprises an indication of a Positioning Reference Signal (PRS) format determined by said apparatus for the positioning procedure based on at least one of: assistance data from a Location Management Function (LMF) or server UE, or sensing of SCIs of other UEs and selection of a mutually orthogonal PRS format.

19. The apparatus according to claim 18, wherein the apparatus allocates the PRS in a distributed manner using its own SCI messages, and wherein a priority of the PRS is progressively raised to ensure that all second terminal devices associated with the first terminal device are allocated needed resources for the positioning procedure.

20. A method comprising:

transmitting, to one or more second terminal devices, a first sidelink signal comprising control information relating to a positioning procedure of a first terminal device, and receiving, from at least one of said one or more second terminal devices, a second sidelink signal comprising at least part of said control information, wherein said second sidelink signal further comprises information relating to transmission of a positioning signal by said respective second terminal device for said positioning procedure, wherein said first sidelink signal comprises a Sidelink Control Information (SCI) Stage 1 signal comprising a PRS format comprising at least one of: an unspecified value, a blank information element, or a reserved value, wherein said second sidelink signal mirrors at least part of the information in the first sidelink signal and further comprises an indication of a Positioning Reference Signal (PRS) format of the positioning signal determined by said respective second terminal device for the positioning procedure, and the method further comprising: monitoring SCI from the one or more second terminal devices to confirm a success of a resource allocation for the positioning procedure and to determine respective PRS format(s) of the one or more second terminal devices.

* * * * *